(12) United States Patent
Zhao et al.

(10) Patent No.: US 11,385,068 B2
(45) Date of Patent: Jul. 12, 2022

(54) PEER TO PEER ROUTE GUIDANCE

(71) Applicant: International Business Machines Corporation, Armonk, NY (US)

(72) Inventors: Wen Rui Zhao, Beijing (CN); Lan Luo, Beijing (CN); De Shuo Kong, Beijing (CN); Liu Xiaojin, Beijing (CN)

(73) Assignee: International Business Machines Corporation, Armonk, NY (US)

(*) Notice: Subject to any disclaimer, the term of this patent is extended or adjusted under 35 U.S.C. 154(b) by 285 days.

(21) Appl. No.: 16/583,551

(22) Filed: Sep. 26, 2019

(65) Prior Publication Data
US 2021/0095985 A1 Apr. 1, 2021

(51) Int. Cl.
*G01C 21/34* (2006.01)
*G06F 16/27* (2019.01)

(52) U.S. Cl.
CPC ..... *G01C 21/3476* (2013.01); *G01C 21/3415* (2013.01); *G01C 21/3492* (2013.01); *G06F 16/27* (2019.01)

(58) Field of Classification Search
CPC ............ G01C 21/3476; G01C 21/3492; G01C 21/3415; G06F 16/27; G06F 16/29
See application file for complete search history.

(56) References Cited

U.S. PATENT DOCUMENTS

| | | | |
|---|---|---|---|
| 7,865,297 B2 | 1/2011 | Ruckart | |
| 8,369,867 B2 | 2/2013 | Van Os | |
| 8,896,485 B2 | 11/2014 | Mendelson | |
| 9,026,621 B2 | 5/2015 | Lou | |
| 2014/0309932 A1 | 10/2014 | Chen | |
| 2017/0139953 A1* | 5/2017 | Arokiaraj | ................ G06F 16/29 |
| 2018/0283883 A1* | 10/2018 | Iland | ................. G01C 21/3423 |
| 2019/0204096 A1* | 7/2019 | Cai | ........................ G01C 21/30 |

OTHER PUBLICATIONS

Wang et al., "A Location and Interest Based Peer to Peer Virtual Navigation System" 978-1-4244-4457-1/09 © 2009 IEEE, 6 pages, <https://ieeexplore.ieee.org/document/5273859>.
Yang et al., "Modeling Dynamic Vehicle Navigation in a Self-organizing, Peer-to-peer, Distributed Traffic Information System", ATMS Testbed Technical Report TTR3-10, Jun. 2005, 33 pages. <http://citeseerx.ist.psu.edu/viewdoc/download?doi=10.1.1.915.505&rep=rep1&type=pdf>.
Yin et al., "Peer-to-Peer Indoor Navigation Using Smartphones", IEEE Journal on Selected Areas in Communications, vol. 35, No. 5, May 2017, © 2017 IEEE, 13 pages, <https://ieeexplore.ieee.org/document/7875135>.

* cited by examiner

*Primary Examiner* — Marthe Y Marc-Coleman
(74) *Attorney, Agent, or Firm* — Brian M. Restauro

(57) ABSTRACT

Embodiments of the present invention provide methods, computer program products, and systems to for dynamically modifying a generated route that enables peer to peer navigation. Embodiments of the present invention can be used to receive input that specifies one or more terms pertaining to a target that is a location of interest from a user. Embodiments of the present invention can pair the user with the target of interest; generating a route to the target and dynamically modify the generated route to the target according to positional information of the location and changes in positional information of the user.

18 Claims, 7 Drawing Sheets

PEER TO PEER ROUTE GUIDANCE

BACKGROUND

The present invention relates generally to the field of navigation systems, and more particularly to peer to peer navigation systems.

In general, navigation systems can determine the position of a user from radio signals of satellites. Typically, navigation systems receive radio signals, calculate a user's position, and route a user to an intended destination. In some instances, navigation systems have features that allow a user to sort route preferences by shortest route and fastest route. In other instances, navigation systems have features to avoid certain locations (e.g., toll roads).

In certain instances, navigation systems can receive input other than a location's physical address. For example, a navigation system can receive input for a non-specific location or a description for a set of various locations rather than the location's physical address.

SUMMARY

Embodiments of the present invention provide methods, computer program products, and systems to for dynamically modifying a generated route that enables peer to peer navigation. In one embodiment of the present invention, a computer-implemented method is provided comprising: receiving input that specifies one or more terms pertaining to a target that is a location of interest from a user; pairing the user with the target of interest; generating a route to the target; and dynamically modifying the generated route to the target according to positional information of the location and changes in positional information of the user.

DETAILED DESCRIPTION

Embodiments of the present invention recognize that navigation services are typically offered by a central vendor. In these instances, embodiments of the present invention recognize that utilizing a central vendor presents certain problems such as having an up-to-date repository for location information (e.g., a street used to navigate to the location is blocked for a specified time period due to an emergency). As used herein, "location information" refers to information about a location and changes to information pertaining to navigation to and from the location. For example, location information can include hours of operation of a building, road closures, anticipated traffic based on scheduled events such as concerts, real-time traffic, queue status of locations such as restaurant wait times, user preferences, etc.)

Embodiments of the present invention further recognize that typical navigation services lack features to navigate a user to a moving destination (e.g., existing navigation services may lack the ability to navigate a user to a moving destination such as a lead car). Finally, embodiments of the present invention recognize that existing solutions fail to navigate a user to a fuzzy destination. A "fuzzy destination" as used herein, refers to a location that is non-specific and is identified and located through the use of one or more terms and/or icons other than the location's physical address or GPS coordinates. Embodiments of the present invention recognize that existing solutions fail to navigate a user to a query such as "a nearby restaurant with the shortest line".

Accordingly, embodiments of the present invention provide solutions for navigation systems. Specifically, embodiments of the present invention improve existing navigation systems and services by providing these systems with the ability for real-time dynamic navigation, peer-to-peer navigation, and fuzzy destination navigation. For example, embodiments of the present invention improve existing navigation systems by pairing a user (e.g., a source) with a location (e.g., a target) and allowing the user to subscribe to real-time changes pertaining to the target (e.g., in instances where the location is a moving target) via blockchain. Embodiments of the present invention further improve existing navigation systems by enabling dynamic navigation to both moving destinations and fuzzy destinations based on a smart contract as discussed in greater detail below.

Figure 1:
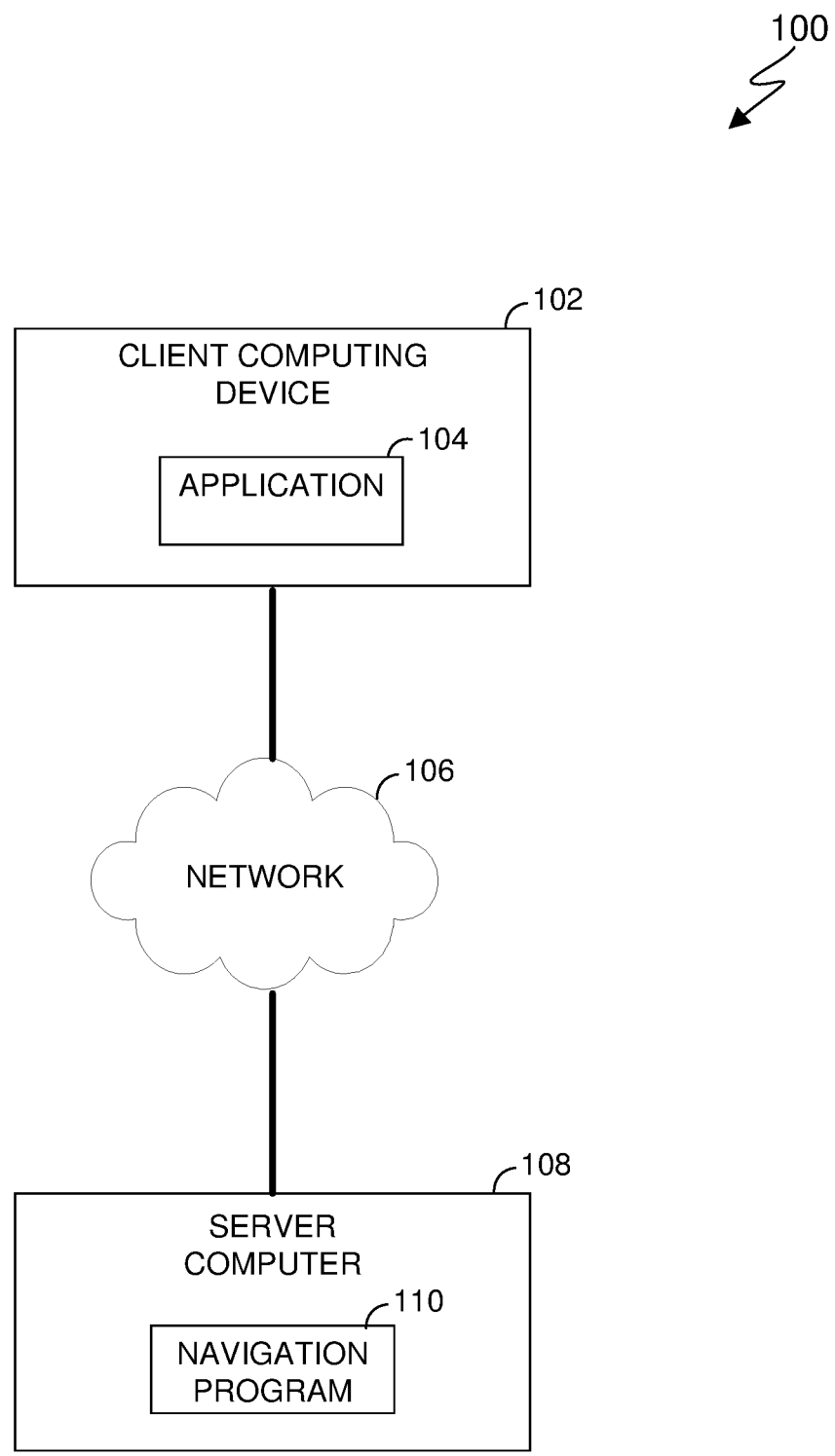
FIG. 1 is a functional block diagram illustrating a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within a computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 7.

Client computing device 102 is a digital device associated with a user and includes application 104. Application 104 communicates with server computer 108 to access navigation program 110 (e.g., using TCP/IP) to enter one or more user search queries. In general, application 104 can be implemented using a browser and web portal or any program that can interface with or otherwise access navigation program 110.

For example, a user can use application 104 to transmit search queries to and receive results from server computer 108. As used herein, a "search query" is a string of query terms pertaining to a target (e.g., particular location of interest to a user). In this embodiment, a search query can be one or more words that describe characteristics associated with the location. In this embodiment, a location can refer to a fixed or moving location. For example, "a fixed location" can be a traditional building with a physical address and/or known GPS coordinates (e.g., stores, shopping malls, toll station, gas station, gymnasium, etc.) In contrast, "a moving location" can be a user having an communications device (e.g., cell phone) or an autonomous vehicle. For example, when a group of users are travelling together, each group member can utilize application 104 to access navigation program 110 to specify a user (e.g., a lead user of the group or the lead user's car) as the location. In another embodiment, a moving location can multiple locations that change based on a given itinerary. For example, an itinerary can specify that location A is a location that a group of users may be found at a certain time and that location B is the location that the group should be at a different time. Accordingly, navigation program 110 can navigate each of the members of the group to follow the specified user as discussed in greater detail with regard to FIGS. 2-6.

Regardless of a whether the location is "fixed" or "moving", navigation program 110 can receive a search query and navigate the user to the user's intended location. In instances where the search query comprises one or more words pertaining to a particular location of interest to a user (as opposed to a physical address or known GPS coordinates, navigation program 110 can still navigate to the intended location (e.g., a "fuzzy destination") utilizing a combination of the search query and information collected from paired users and locations described in greater detail with regard to FIGS. 2-6.

In other embodiments, a search query can also include one or more graphical icons representative of geographical indicators used to locate an area of interest. The term "geographical indicators", as used herein, refer to positional information that can be entered by a user. For example, a geographical indicator can be a junction point (such as Y, X, O-shaped junctions), places of interests (such as gas station, restaurant, hospital, etc.), directional information with respect to places of interests (such as right of gas station, left of restaurant, etc.), proximity to a current or known location (such as a search radius, search region, etc.), and navigational direction with respect to the proximity to a current location (such as north, south, east, west, etc.).

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts navigation program 110. In other embodiments, navigation program 110 can be stored locally on client computing device 102. In yet other embodiments, navigation program 110 can be stored on a combination of client computing device 102, server computer 108, or any other component of computing environment 100.

Navigation program 110 provide navigation services that allows for real-time dynamic navigation, peer-to-peer navigation, and fuzzy destination navigation. In this embodiment, navigation program 110 pairing a user (e.g., a source) with a location (e.g., a target) and establishing a Certificate Authority for paired users and locations. Navigation program 110 then utilizes a blockchain ledger (using the Certificate Authority to access the blockchain ledger) that allows the user to subscribe to and receive real-time changes pertaining to the target (e.g., hours of operation of a building, road closures, anticipated traffic based on scheduled events such as concerts, real-time traffic, queue status of locations such as restaurant wait times, user shopping preferences, changes in location where the location is a moving location, etc.) as discussed in greater detail with regard to FIG. 2-6.

Figure 2:
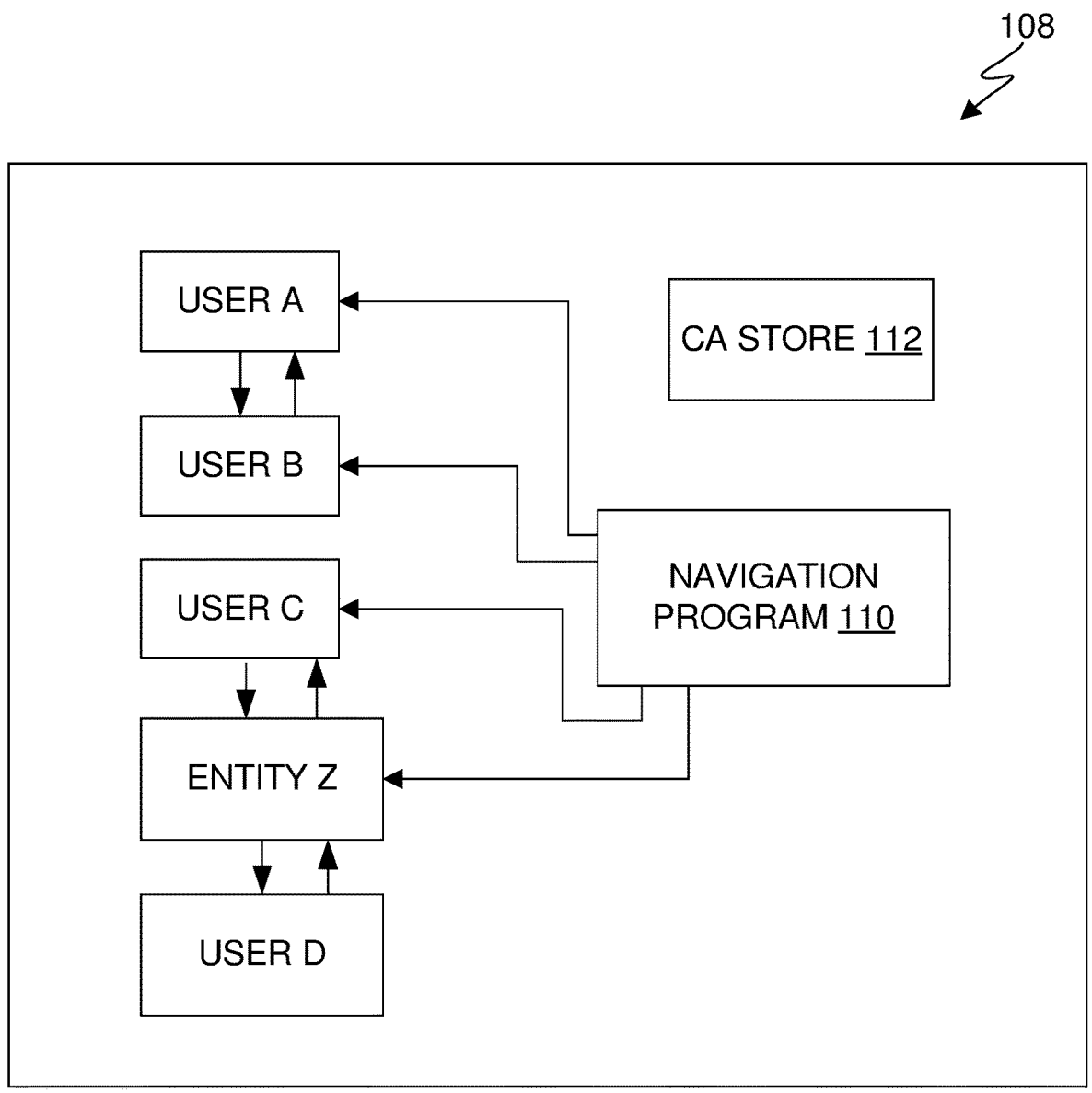
FIG. 2 is an example block diagram of components of navigation service on a Hyperledger fabric, in accordance with an embodiment of the present invention.

FIG. 2 is an example block diagram of components of navigation service on a Hyperledger fabric, in accordance with an embodiment of the present invention.

In this example, server computer 108 is a Hyperledger fabric framework that is used to establish a blockchain record of paired users and locations and contains information for each event in a navigation request (e.g., where a search query has been submitted and a route has been generated to the location).

In this example, users requesting navigation services (e.g., via application 104) are registered with and issued a respective Certificate Authority from Certificate Authority (CA) Store 112 via an enrollment mechanism. In this embodiment, users can use application 104 to register at a designated web portal. In this example, CA store 112 can be implemented with any storage architecture known in the art.

Navigation program 110 has registered users A, B, C, E, and location D. In this example, navigation program 110 utilizes Remote Procedure (e.g., gRPC) calls to provide authentication and bidirectional streaming and flow control of information. Each navigation event (e.g., directional navigation information) is subsequently recorded in a blockchain (not shown).

In this embodiment, a "navigation event" is defined as directional information or changes in directional information that includes a user or a target's location. A navigation event can also include positional information surrounding an area of either the user or target. For example, positional information can include hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user or the user's vehicle).

In this example, navigation program 110 has subsequently paired User A and B and has issued a smart contract for each user. In this embodiment, a smart contract is defined as a computer protocol intended to digitally facilitate, verify, and enforce performance of an action. In this example, the action is a search request from User A to navigate to User B (e.g., User B is the target location). Navigation program 110 uses the information in the smart contract to identify that User B is traveling on foot toward a location. Navigation program 110 transmits a notification to User B of User A's request. In this example, User B's preferences indicate that User A can access and navigate to User B's location for a certain time period. In instances where User B has not indicated a preference, navigation program 110 can transmit a notification and request to User B requesting User B to share User B's location with User A. Accordingly, in response to User B's confirmation, navigation program 110 begins route guidance to User A's location.

Navigation program 110 has also registered Users C, D, and location Z but has paired User C with location Z and User D with location Z. Subsequently, navigation program 110 has registered those separate pairings and issued respective Certificate Authorities. In this embodiment, location Z is a physical building with a known address. Navigation program 110 can than transmit different route guidance instructions to Users C and D, respectively, log each navigation event in a blockchain ledger, and dynamically modify the generated route guidance instructions based on logged navigation events.

Figure 3:
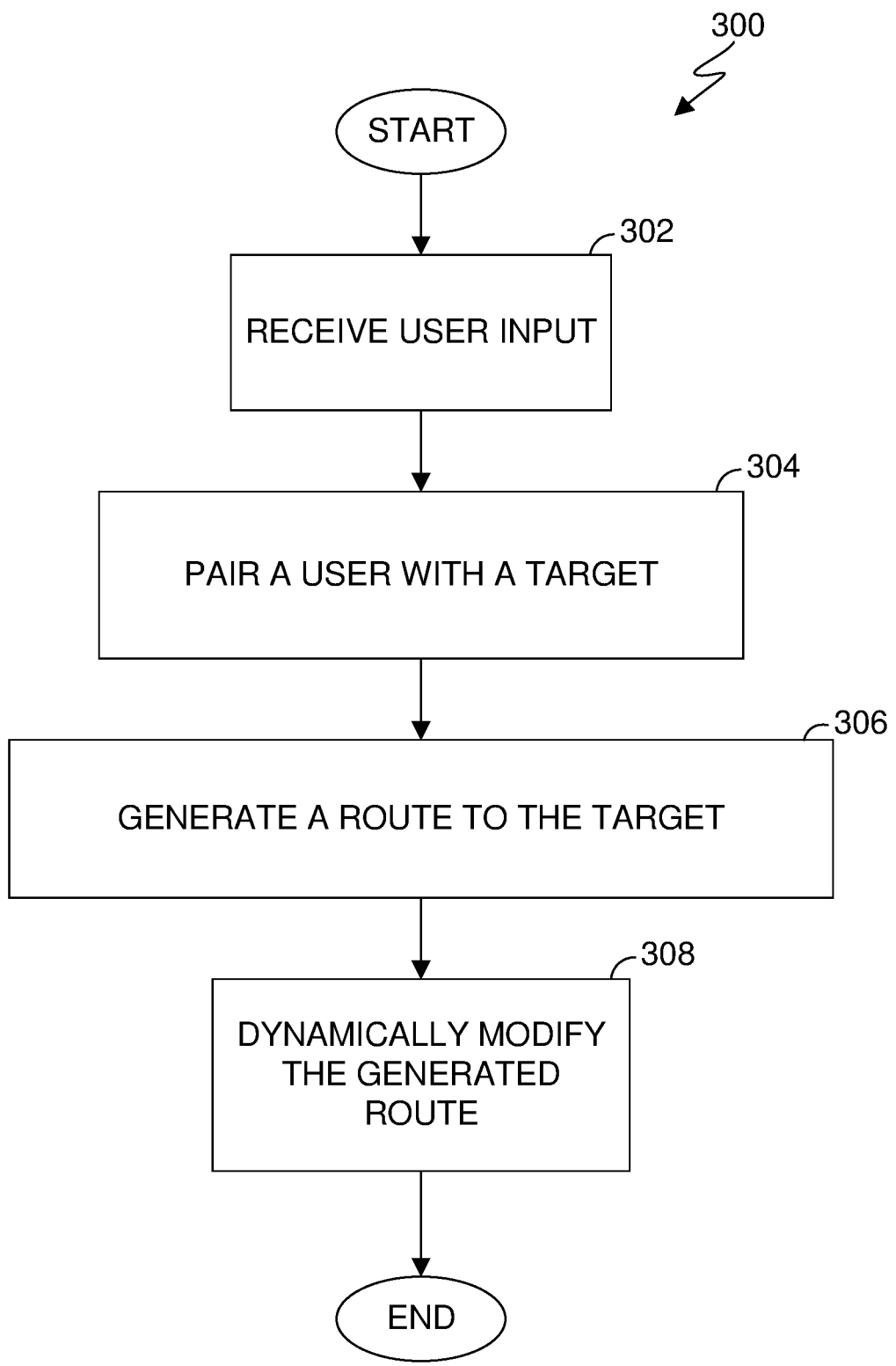
FIG. 3 is a flowchart depicting operational steps for dynamically modifying a generated route that enables peer to peer navigation, in accordance with an embodiment of the present invention.

FIG. 3 is a flowchart 300 depicting operational steps for dynamically modifying a generated route that enables peer to peer navigation, in accordance with an embodiment of the present invention.

In step 302, navigation program 110 receives user input. In this embodiment, navigation program 110 receives user input from client computing device via application 104. As previously discussed, a "search query" is a string of query terms pertaining to a particular location of interest to a user. In this embodiment, a search query can be one or more words that describe characteristics associated with the location. In this embodiment, a location can refer to a fixed or moving location. For example, "a fixed location" can be a traditional building with a physical address and/or known GPS coordinates (e.g., stores, shopping malls, toll station, gas station, gymnasium, etc.) In contrast, "a moving location" can be a user having an communications device (e.g., cell phone) or an autonomous vehicle. For example, when a group of users are travelling together, each group member can utilize application 104 to access navigation program 110 to specify a user (e.g., a lead user of the group or the lead user's car) as the location.

In other embodiments, a search query can further include one or more graphical icons representative of geographical indicators used to locate an area of interest (such as a junction point (such as Y, X, O-shaped junctions)), places of interests (such as gas station, restaurant, hospital, etc.), directional information with respect to places of interests (such as right of gas station, left of restaurant, etc.), proximity to a current or known location (such as a search radius), and navigational direction with respect the proximity to a current location (such as north, south, east, west, etc.)). In other embodiments, positional navigation program 110 can receive search queries from one or more other components of computing environment 100.

In step 304, navigation program 110 pairs a user with a target. In this embodiment, navigation program 110 pairs a user with a target by creating a smart contract. In this embodiment, navigation program 110 creates a contract by transmitting a request to the user to enroll in a subscription based service to the target. As previously discussed, a target get can either be fixed or moving. In instances where the target is moving (e.g., another user or autonomous vehicle), navigation program 110 transmits a notification to the target to confirm that the target will grant access to the target's location information (e.g., whether the target will grant the user access to the target's physical location, changes in movement, changes in cardinal direction, real time driving conditions, anticipated traffic based on scheduled events such as concerts, etc.). In other embodiments, navigation program 110 can retrieve user preferences and automatically grant or revoke access to a user's location information based on the retrieved user preferences.

In response to receiving a confirmation from the user and enrolling in the subscription based service to the target, navigation program 110 creates a smart contract between the user and the target. In this embodiment, navigation program 110 pairs the user with the target, collects, and stores the following information (with permission from the user and the target): a static local map, each respective user's registered GPS device (e.g., phone, autonomous vehicle, etc.), pre-defined authorized Edge Cloud, and user preferences. In instances where there are multiple users, navigation program 110 registers each individual user and their respective devices and creates an individual smart contract for each of user in the group.

In some embodiments, navigation program 110 can then publish the created smart contract between the user and the target to a blockchain. Navigation program 110 can then log and track navigation events of the user, between multiple users, and/or navigation events pertaining to the target.

In step 306, navigation program 110 generates a route to the target. In this embodiment, navigation program 110 generates a route to the target based on navigation events pertaining to the user and the target. As mentioned earlier, a "navigation event" is defined as directional information that includes a user or a target's location. A navigation event can also include positional information surrounding an area of either the user or target. For example, positional information can include hours of operation of a building, road closures, anticipated traffic based on scheduled events such as concerts, real-time traffic, queue status of locations such as restaurant wait times, user shopping preferences, changes in location where the location is a moving location, speed and cardinal direction of a location (e.g., where the location destination is a user, the speed of the location can be of the user or the user's vehicle).

In this embodiment, navigation program 110 can generate a route to the target by accessing user preferences and generating a route based the user input (e.g., search query), and received navigation events. For example, navigation program 110 can receive a user input from User A to mark User B (and User B's vehicle) as the dynamic destination. After navigation program 110 confirms from both users that it has permission (e.g., via request or user preferences) to begin navigation, navigation program 110 generates a smart contract and generates the route to the target using the user input and any navigation event related to the user and target (e.g., User A and User B). For example, where the user input specifies that User A arrive within two minutes and should be within a 200 meter radius of User B, navigation program 110 can generate a route for User A to User B based on User A's current mode of transportation, and any initially received navigation events (e.g., where User B is currently on a street heading north, navigation program 110 identifies the street and generates a route to that particular street such that User A travels that same path (e.g., that particular street, to head north).

In instances where the target's location is moving and not known (e.g., where the user may be attempting to caravan with a friend), Navigation program 110 can then transmit a location request to the target and, in response to receiving a confirmation to share the target's location, navigation program 110 can identify the target's location by accessing and registering a device of the user that can transmit the user's location (e.g., GPS coordinates, physical address, etc.).

In instances where the target's location is fixed and not known (e.g., where the user may not know the target location's physical or GPS address), navigation program 110 can search for locations that meet one or more keywords identified in the user's input. For example, navigation program 110 can generate a route to the unknown location (e.g., fuzzy destination), by searching one or more databases (e.g., social media applications, pictures, audio, video, etc.) that matches a received input (e.g., a received criteria). In one example, navigation program 110 can generate a route to the unknown location by searching certain junction points that the user described. Navigation program 110 can further refine the search and generate a route by searching one or more databases (e.g., social media websites, public map databases) for images that match other descriptors the user provided as part of the user's input.

In step 308, navigation program 110 dynamically modifies the generated route. In this embodiment, navigation program 110 dynamically modifies the generated route based on one or more received navigation events. In this embodiment navigation program 110 receives navigation events as recorded and stored in a blockchain ledger. Navigation program 110 can then dynamically modify the generated route based on the received navigation event and user preferences.

For example, where the user input specifies that User A arrive within two minutes and should be within a 200 meter radius of User B, navigation program 110 can first generate a route for User A to User B based on User A's current mode of transportation, and User B's location. In this example, where User B is moving, navigation program 110 can identify User B's movement and cardinal direction (e.g., where User B is currently a street heading north and changes direction and street to head west on that street), navigation program 110 identifies the street and directional change and generates a route to that particular street such that User A travels that same path (e.g., such that User A also turns and heads south on that street).

In other embodiments, navigation program 110 can dynamically modify the generated route by optimizing the route such that User A and User B arrive at User B's destination at the same time or within a certain time period. For example, User A may not know User B's intended destination but transmits a request to navigation program 110 to navigate to User B and User B's destination. Navigation program 110 can reference user A's preferences and in response to receiving a navigation event (e.g., where User B has specified User B's intended location) from the target (e.g., User B), navigation program 110 can adjust User A's route such that User A arrives at the same time as User B.

In instances where the target's location is moving and not known (e.g., where User B deviates from User B's navigation route (e.g., to stop at a gas station), navigation program 110 can transmit a notification to the user (e.g., User A) and request confirmation before modifying the generated route. In other instances where a target's location is not known (e.g., where User A's preferences and search query is to follow a specified lead car), navigation program 110 can navigate the user based on navigation events taken by the target.

In instances where the target's location is fixed navigation program 110 search one or more public databases and/or social media websites to identify one or more navigation events that can impact route guidance to the target location. For example, navigation program 110 can access and identify, using a combination of natural language processing and machine learning techniques, hours of operation of a location, current road closures, anticipated road closures based on construction schedules, anticipated traffic based on scheduled events such as concerts, real-time traffic, queue status of locations such as restaurant wait times, user shopping preferences.

Figure 4:
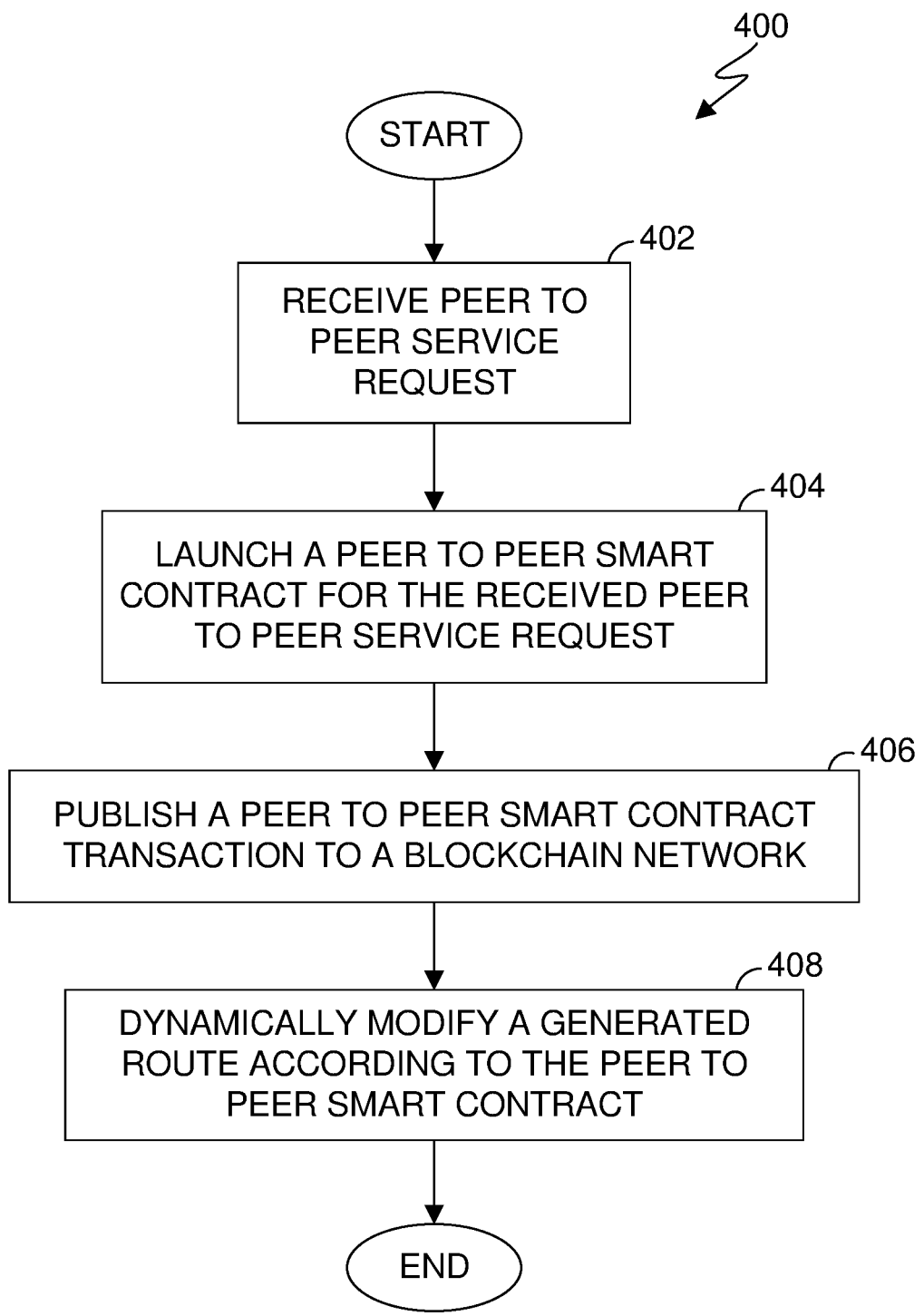
FIG. 4 is a flowchart depicting operational steps of dynamically modifying a generated route according to a peer to peer smart contract, in accordance with an embodiment of the present invention.

FIG. 4 is a flowchart 400 depicting operational steps of dynamically modifying a generated route according to a peer to peer smart contract, in accordance with an embodiment of the present invention.

In step 402, navigation program 110 receives a peer to peer service request. In this embodiment, navigation program 110 receives a peer to peer request from client computing device 102 (e.g., via a transmitted request from application 104 using network 106).

In step 404, navigation program 110 launches a peer to peer smart contract for the received peer to peer service request. In this embodiment, navigation program 110 launches a peer to peer smart contract for the received peer to peer service request by confirming the service request. In instances where the service request involves one or more users (e.g., where a group of users are travelling, where a user is navigating to a moving location such as another user, etc.), navigation program 110 confirms parameters of the smart contract with each user.

In step 406, navigation program 110 publishes a peer to peer smart contract transaction to a blockchain network. In this embodiment, navigation program 110 publishes the smart peer to the blockchain ledger via network 106. For example, navigation program 110 can publish a static local map, registered user's devices (e.g., register user's GPS device), and predefined authorized Edge cloud).

In step 408, navigation program 110 dynamically modifies a generated route according to the peer to peer smart contract. In this embodiment, navigation program 110 dynamically modifies the generated route according to navigation events logged in the published blockchain ledger. In this embodiment, navigation program 110 enables a user to see real time updates (e.g., navigation events) using a Certificate Authority to access the blockchain ledger. For example, navigation program 110 can identify that there is peak traffic due to a sporting event and accordingly modify the generated route. In response to fulfilling the contract parameters, navigation program 110 terminates the published smart contract. In this embodiment, fulfilling the contract parameters includes fulfilling conditions specified and agreed upon by users (e.g., where all members of the group are together, arrive at the same location, etc.).

Figure 5:
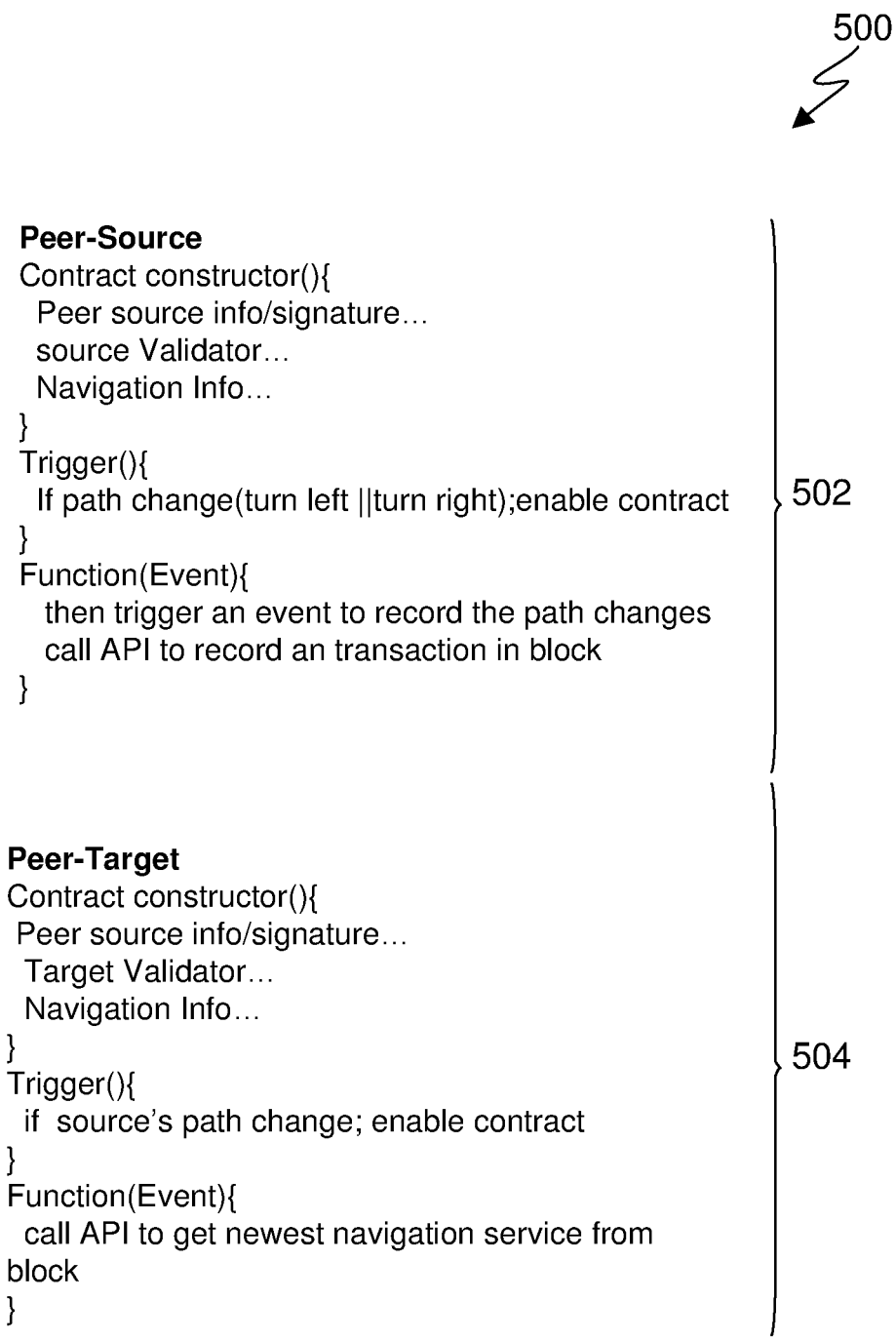
FIG. 5 is an example diagram that code used in a smart contract that enables dynamic routing, in accordance with an embodiment of the present invention.

FIG. 5 is an example diagram that code used in a smart contract that enables dynamic routing, in accordance with an embodiment of the present invention.

In this example diagram, diagram 500, example code 502 and example code 504 is shown. Example code 502 and 504 correspond to respective smart contracts that navigation program 110 generated in response to confirming parameters of the smart contract. In this example, example code 502 corresponds to smart contract terms of the source (e.g., User A) while example code 504 corresponds to smart contract terms of the target (e.g., User B or a location).

Figure 6:
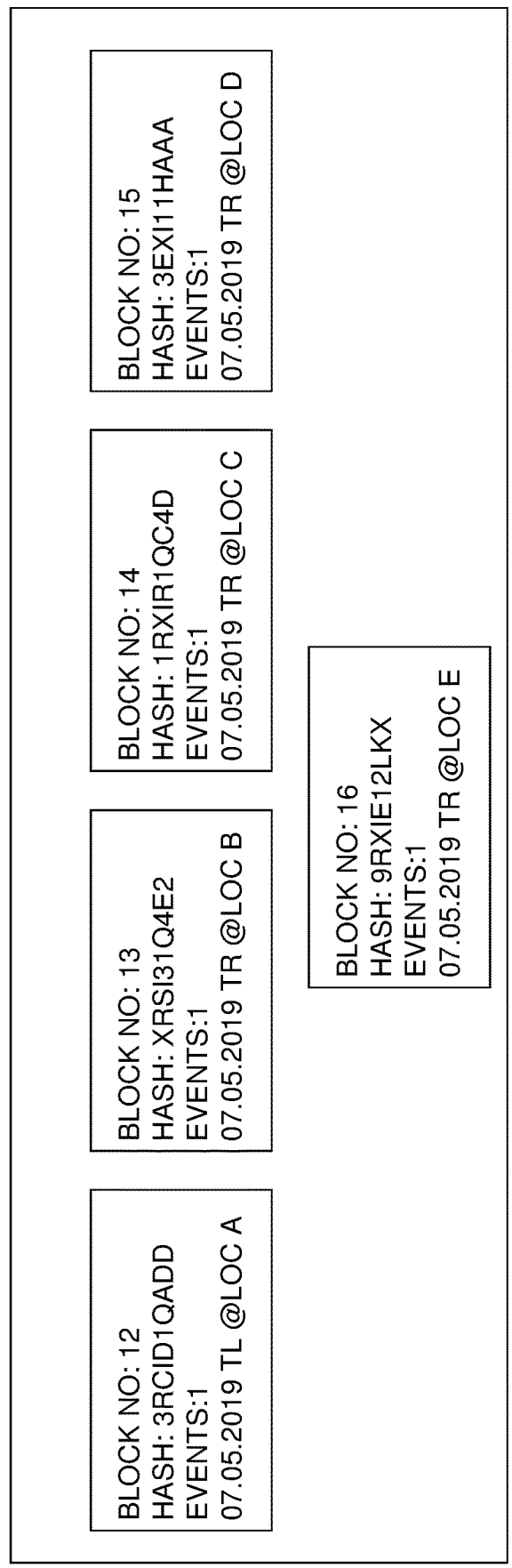
FIG. 6 is an example diagram of a blockchain that depicts events in a dynamic navigation service, in accordance with an embodiment of the present invention.

FIG. 6 is an example diagram of a blockchain that depicts events in a dynamic navigation service, in accordance with an embodiment of the present invention.

In this example diagram, navigation program 110 has accessed blockchain ledger 600. Blockchain ledger 600 displays five navigation events referenced as block numbers 12, 13, 14, 15, and 16, respectively. Each navigation event contains a different block number that when considered together, reflect a sequential order of navigation events. For example block number "1" designates the first navigation event. Each block navigation event further contains respective hash values and can record any number of events. Finally, each navigation event further includes a time and date stamp and location identifier.

Figure 7:
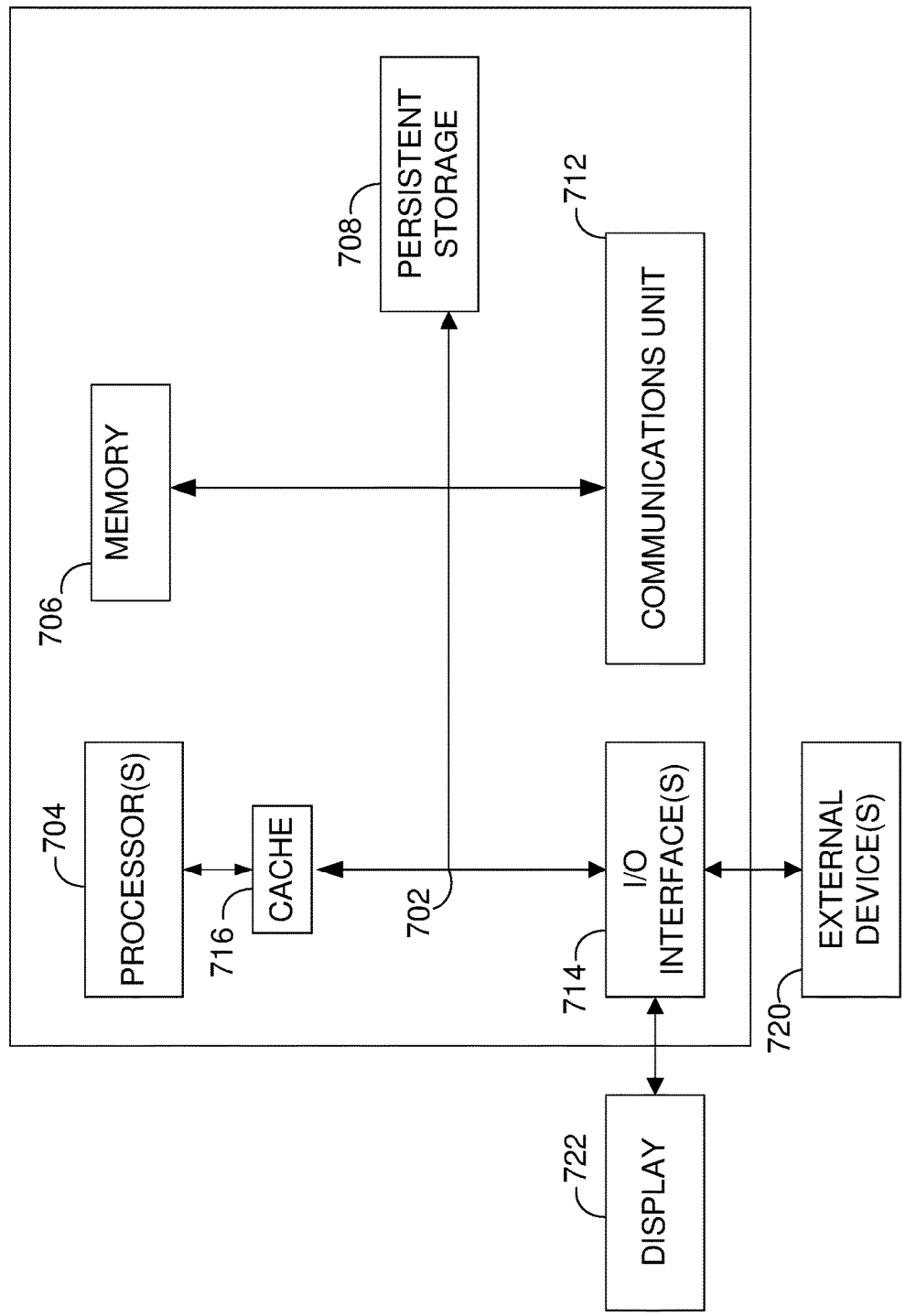
FIG. 7 depicts a block diagram of components of the computing systems of FIG. 1, in accordance with an embodiment of the present invention.

FIG. 7 depicts a block diagram of components of computing systems within computing environment 100 of FIG. 1, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Navigation program 110 (not shown) may be stored in persistent storage 708 and in memory 706 for execution by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Navigation program 110 may be downloaded to persistent storage 708 through communications unit 710.

I/O interface(s) 712 allows for input and output of data with other devices that may be connected to client computing device 102 and server computer 108. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving input that specifies one or more terms pertaining to a target that is a location of interest from a user;
   pairing the user with the target of interest a smart contract between the user and the location that is published to a blockchain ledger;
   generating a route to the target; and
   dynamically modifying the generated route to the target according to positional information of the target and changes in positional information of the user.

2. The computer-implemented method of claim 1, wherein the location of interest either a fixed location or a moving location.

3. The computer-implemented method of claim 1, further comprising:
   generating a smart contract between the user and the location; and
   publishing the generated smart contract between the user and the location to a blockchain ledger.

4. The computer-implemented method of claim 3, further comprising:
   recording a navigation event associated with the generated smart contract; and
   dynamically modifying the generated route to the target according to the navigation event and changes to positional information of the user.

5. The computer-implemented method of claim 4, wherein a navigation event comprises: hours of operation of a location, road closures of roads that lead to the location, anticipated traffic surrounding an area of the location based on scheduled events, real-time traffic of roads leading to the location, queue status of the location, user shopping preferences, changes to movement of the target.

6. The computer-implemented method of claim 1, further comprising:
   searching for a location that matches the one or more terms representative of an unknown location by identifying a known location of the user; and
   refining a search region based, at least in part, on the received one or more terms.

7. A computer program product comprising:
   one or more computer readable storage media and program instructions stored on the one or more computer readable storage media, the program instructions comprising:
      program instructions to receive input that specifies one or more terms pertaining to a target that is a location of interest from a user;
      program instructions to pair the user with the target of interest using a smart contract between the user and the location that is published to a blockchain ledger;
      program instructions to generate a route to the target; and
      program instructions to dynamically modify the generated route to the target according to positional information of the target and changes in positional information of the user.

8. The computer program product of claim 7, wherein the location of interest either a fixed location or a moving location.

9. The computer program product of claim 7, wherein the program instructions stored on the one or more computer readable storage media further comprise:
   program instructions to generate a smart contract between the user and the location; and
   program instructions to publish the generated smart contract between the user and the location to a blockchain ledger.

10. The computer program product of claim 9, wherein the program instructions stored on the one or more computer readable storage media further comprise:
    program instructions to record a navigation event associated with the generated smart contract; and
    program instructions to dynamically modify the generated route to the target according to the navigation event and changes to positional information of the user.

11. The computer program product of claim 10, wherein a navigation event comprises: hours of operation of a location, road closures of roads that lead to the location, anticipated traffic surrounding an area of the location based on scheduled events, real-time traffic of roads leading to the location, queue status of the location, user shopping preferences, changes to movement of the target.

12. The computer program product of claim 7, wherein the program instructions stored on the one or more computer readable storage media further comprise:
    program instructions to search for a location that matches the one or more terms representative of an unknown location by identifying a known location of the user; and
    program instructions to refine a search region based, at least in part, on the received one or more terms.

13. A computer system comprising:
    one or more computer processors;
    one or more computer readable storage media; and
    program instructions stored on the one or more computer readable storage media for execution by at least one of the one or more computer processors, the program instructions comprising:
       program instructions to receive input that specifies one or more terms pertaining to a target that is a location of interest from a user;
       program instructions to pair the user with the target of interest using a smart contract between the user and the location that is published to a blockchain ledger;
       program instructions to generate a route to the target; and
       program instructions to dynamically modify the generated route to the target according to positional information of the target and changes in positional information of the user.

14. The computer system of claim 13, wherein the location of interest either a fixed location or a moving location.

15. The computer system of claim 13, wherein the program instructions stored on the one or more computer readable storage media further comprise:
    program instructions to generate a smart contract between the user and the location; and
    program instructions to publish the generated smart contract between the user and the location to a blockchain ledger.

16. The computer system of claim 15, wherein the program instructions stored on the one or more computer readable storage media further comprise:
    program instructions to record a navigation event associated with the generated smart contract; and
    program instructions to dynamically modify the generated route to the target according to the navigation event and changes to positional information of the user.

17. The computer system of claim 16, wherein a navigation event comprises:
    hours of operation of a location, road closures of roads that lead to the location, anticipated traffic surrounding an area of the location based on scheduled events, real-time traffic of roads leading to the location, queue status of the location, user shopping preferences, changes to movement of the target.

18. The computer system of claim 13, wherein the program instructions stored on the one or more computer readable storage media further comprise:
    program instructions to search for a location that matches the one or more terms representative of an unknown location by identifying a known location of the user; and program instructions to refine a search region based, at least in part, on the received one or more terms.

* * * * *